Jan. 1, 1924
O. D. MONROE
POSTHOLE DIGGER
Filed July 15, 1922
1,479,310
3 Sheets-Sheet 1
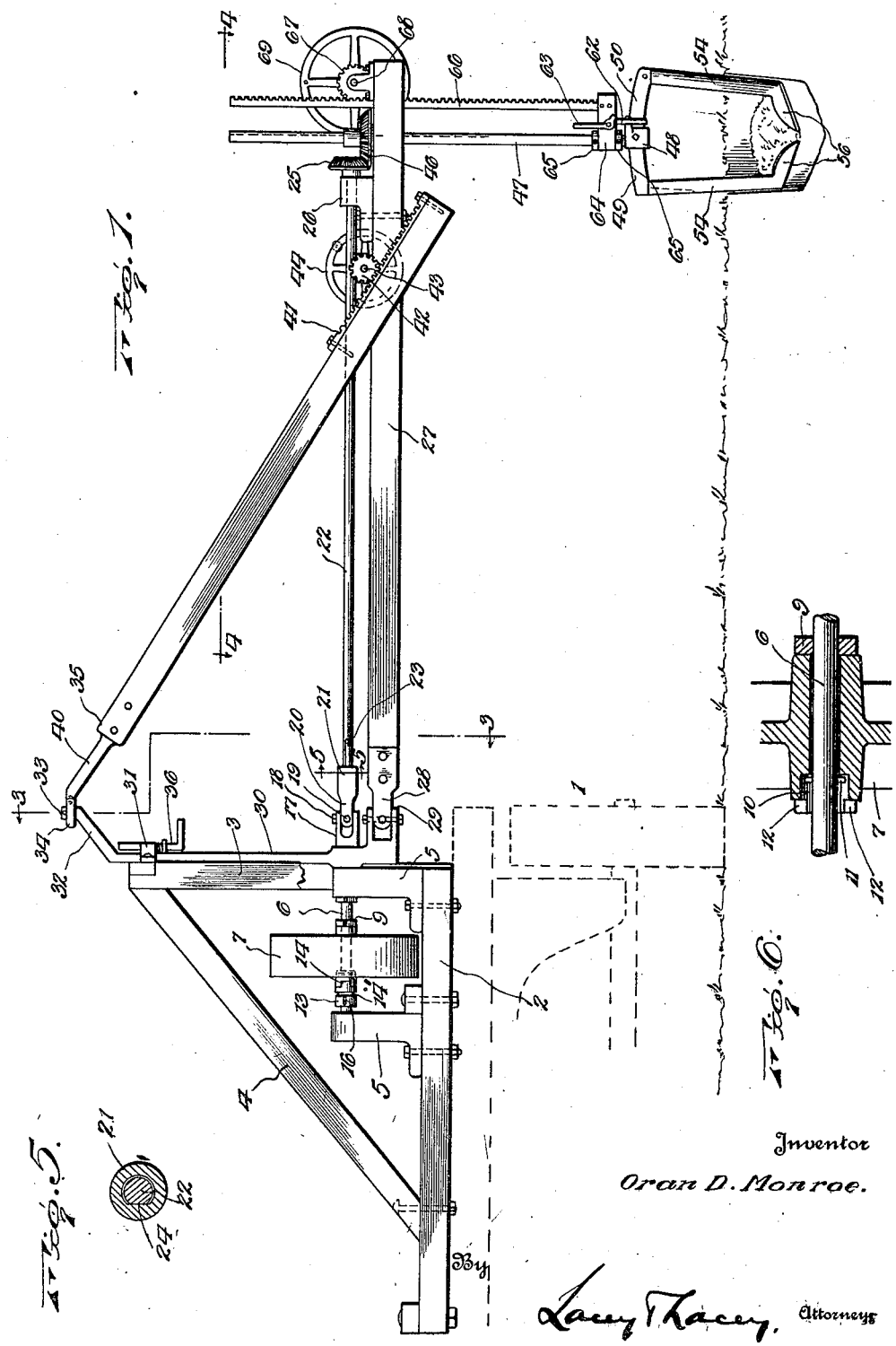
Inventor
Oran D. Monroe.
By Lacey & Lacey, Attorneys

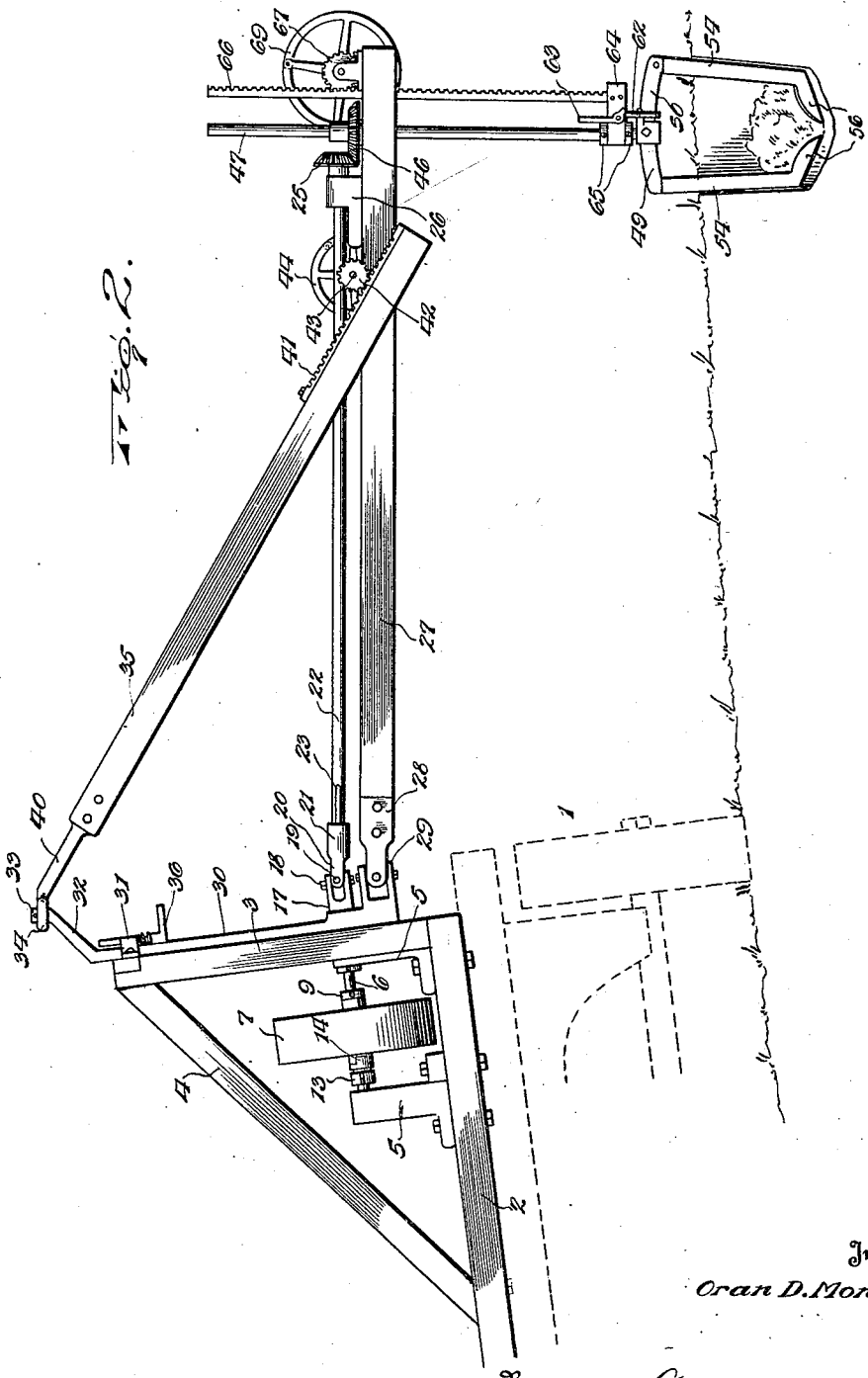

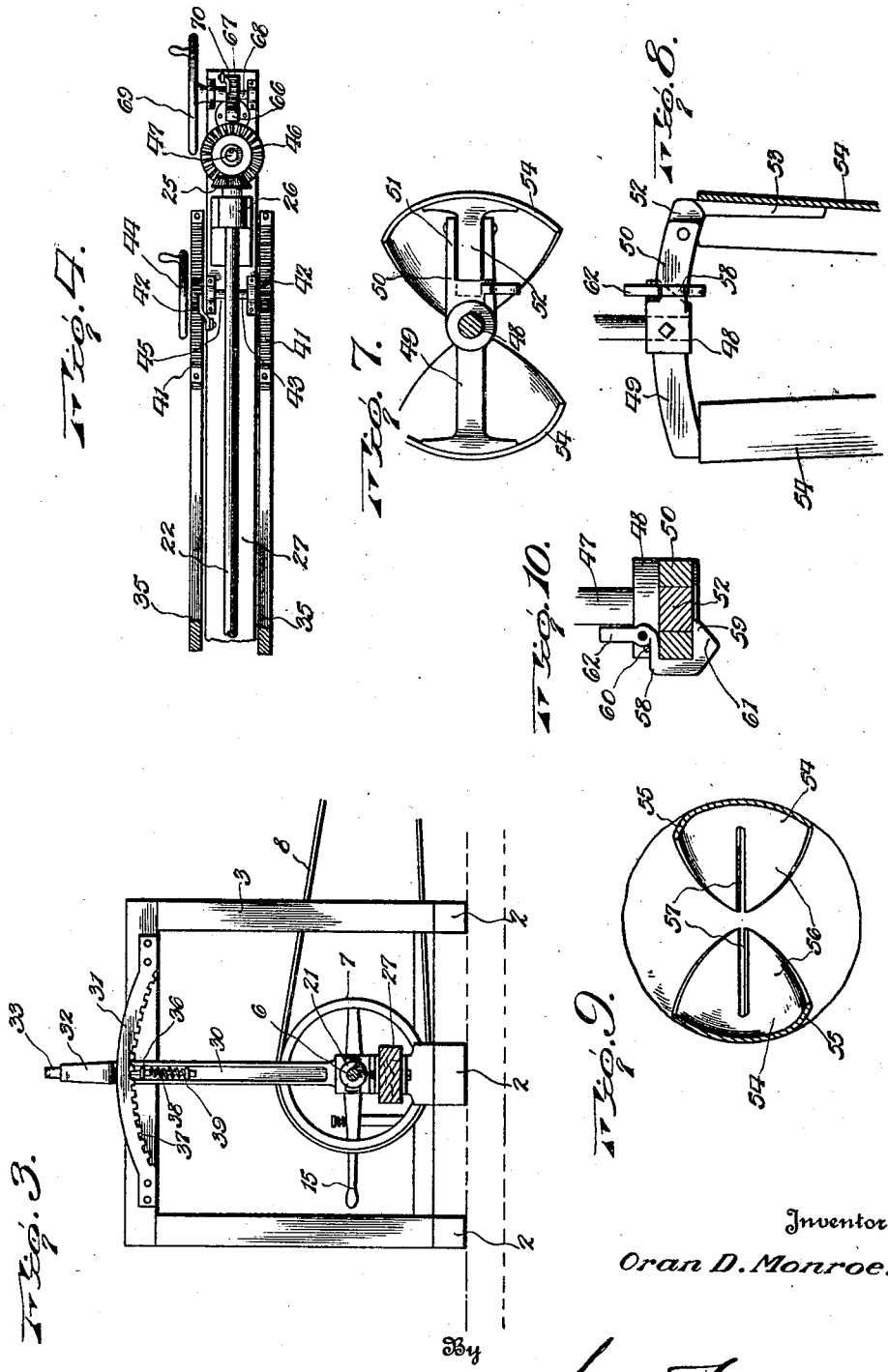

Patented Jan. 1, 1924.

1,479,310

UNITED STATES PATENT OFFICE.

ORAN D. MONROE, OF CELINA, OHIO.

POSTHOLE DIGGER.

Application filed July 15, 1922. Serial No. 575,151.

*To all whom it may concern:*

Be it known that I, ORAN D. MONROE, a citizen of the United States, residing at Celina, in the county of Mercer and State of Ohio, have invented certain new and useful Improvements in Posthole Diggers, of which the following is a specification.

This invention relates to post-hole diggers and has for its object the provision of an apparatus which may be mounted upon a truck or sled and actuated by an engine also mounted upon the truck or sled. Another object of the invention is to provide a power-driven post-hole digger which may be readily adjusted so that, notwithstanding any irregularity or inclination of the surface of the ground, the post hole will be formed about a perpendicular axis. A further object of the invention is to provide means whereby the dirt to be removed from the hole may be readily extracted and easily and quickly deposited at one side. Other incidental objects of the invention will appear in the course of the following description, and the invention resides in certain novel features which will be particularly pointed out in the claims following the description.

In the accompanying drawings, which illustrate one embodiment of my invention,

Figure 1 is a side elevation of the apparatus showing the same disposed for operation upon level ground;

Fig. 2 is a similar view showing the device arranged for use upon an inclined surface;

Fig. 3 is a detail sectional elevation on the line 3—3 of Fig. 1;

Fig. 4 is a horizontal section on the line 4—4 of Fig. 1;

Fig. 5 is a detail section on the line 5—5 of Fig. 1;

Fig. 6 is a detail section showing the mounting of the driving pulley;

Fig. 7 is a plan view of the blades;

Fig. 8 is an enlarged sectional elevation of the upper portion of the blades;

Fig. 9 is a horizontal section of the blades;

Fig. 10 is an enlarged detail sectional elevation of the latch whereby the dumping of the extracted dirt is controlled.

In the drawings, a portion of a truck is indicated at 1 by dotted lines. The truck or other vehicle may be any vehicle now in use upon farms or any other places, or it may be a tractor having a platform supported at and projecting from its front or rear end. In carrying out my invention, I secure upon the truck transversely thereto a base or sills 2 supporting an upright frame 3 at one side of the truck, which frame 3 is braced by the braces 4 extending between the top of the frame and the sills. Upon the central sill 2, I erect bearing brackets or posts 5 in which is journaled the driving shaft 6, upon which a band pulley 7 is loosely mounted. In the actual practice of the invention, an internal combustion engine will be mounted upon the truck and will be connected by a belt 8 with the pulley 7 so that the driving shaft 6 may be readily rotated. The driving pulley 7 is held against movement along the shaft 6 by a stop collar 9 secured upon the shaft and bearing against the outer end of the hub of the pulley, while at its inner end the hub of the pulley is constructed with a circular recess 10 to receive a pin 11 which is inserted through the shaft 6 so that the pulley will be effectually held in position upon the shaft between the stop collar 9 and the said pin 11, as will be readily understood on reference to Fig. 6. The inner end of the hub is also provided with notches 12 whereby the end of the hub may be utilized as one member of a clutch. The co-acting member of the clutch consists of a sleeve 13 having lugs 14 adapted to engage the notches 12 in the clutch hub and also provided with an annular groove 14' which may be engaged by a yoke carried by a hand lever 15 mounted and held in any convenient manner upon one of the sills 2 and operable to shift the clutch sleeve into or out of engagement with the clutch hub. The clutch sleeve is constructed with a longitudinal slot through which a pin or stud may be inserted into the shaft, as indicated at 16, whereby the sleeve may be slid upon the shaft but will be constrained to rotate therewith. Therefore, when the clutch members are in engagement, the motion of the band pulley 7 will be transmitted to the shaft 6, but when the clutches are out of engagement, the pulley will simply rotate freely upon the shaft without actuating it. As shown clearly in Figs. 1 and 2, the driving shaft 6 projects laterally beyond the upright frame 3 and terminates in a fork 17 in which is fitted a pivot 18 having lateral lugs 19 pivotally engaging a fork 20 which is formed integral with the inner end of a socket 21.

The socket 21 receives the inner end of a transmission shaft 22 and the end of the said shaft has a flattened portion 23 engaging a flattened side 24 of the socket so that, while the shaft may have endwise movement within the socket, it will be forced to rotate therewith. It will be readily noted that the members 17 and 20 constitute a universal joint between the shafts 6 and 22 so that the shaft 22 may be adjusted readily in all directions relative to the shaft 6 to compensate for irregularities in the surface of the ground or permit the machine to be used upon a hillside. The outer end of the shaft 22 is equipped with a beveled gear 25 and is mounted in a bearing post or bracket 26 upon the supporting bar or beam 27. The said beam 27 is disposed below the shaft 22, as shown, and is intended to be parallel with the said shaft at all times. At its inner end, the beam is equipped with a fork 28 constituting one member of a universal coupling similar to the coupling provided by the members 17, 18, 19 and 20, previously described. The fork 29 which is coupled to the fork 28 is formed on or secured to the lower end of a radius rod 30 which is pivotally mounted upon the driving shaft 6, between the fork 17 and the adjacent bearing post or bracket 5, and extends upwardly in front of the frame 3. The upper portion of the radius bar 30 extends between the upper end of the frame 3 and a rack 31 secured to the outer side of said frame, and the extremity of the rod is offset, as shown at 32, to provide a crank terminating in a pin or stud 33 of circular cross section which is pivotally engaged by an eye 34 at the upper end of a bracing frame 35. A latch 36 is mounted upon the radius bar below the rack 31 and is adapted to engage in one of the notches 37 in said rack, the latch being held in engagement with the notch by a spring 38 coiled around the latch, between an abutment thereon and a guide 39 upon the bar. The bracing frame 35 comprises parallel bars connected at their upper ends to a head 40 upon which the eye 34 is formed, the said parallel bars passing downwardly and outwardly at opposite sides of the beam 27 and the shaft 22, as clearly shown in Fig. 4. Upon the upper edges of the bars at the lower ends thereof are racks 41 which are engaged by pinions 42 carried by a shaft 43 mounted in suitable bearings upon the beam 27 and equipped with a hand wheel 44 whereby it may be rotated. A suitable holding dog 45 is also provided to maintain the shaft in a set position. It will be readily understood that by rotating the hand wheel, the pinions 42 will be rotated and caused to travel relatively upon the racks 41 so that the distance between the shaft 43 and the upper end of the bracing frame may be increased or diminished as may be necessary to maintain the beam 27 and the shaft 22 in a horizontal plane.

Upon the upper side of the beam 27 adjacent the outer end thereof is rotatably supported a gear 46 meshing with the gear 25 on the outer end of the shaft 22. This gear 46 is fitted around the digger shaft 47 and feathered thereon so that, while the shaft will be constrained to rotate with the gear, it may slide vertically through the gear. The lower extremity of the digger shaft 47 is formed into or equipped with a collar or a head 48 from which arms 49 and 50 extend in opposite directions from diametrically opposite points. The arm 50 is bifurcated, as shown at 51 in Fig. 7, and receives a mating arm 52 which is pivoted between the extremities of the bifurcation. The arms 49 and 52 are constructed with the depending laterally expanded attaching plates 53 to which the blades 54 are rigidly secured. These blades, as shown clearly in Fig. 9, are of arcuate form, the arcs being turned sharply inwardly, as shown at 55, at the edges remote from the cutting edges. The lower ends of the blades are turned sharply inwardly, as shown at 56, and the forward edges of these inturned extremities are sharpened to provide cutting edges. The inturned ends are also slitted, as indicated at 57, and the rear edge or wall of each slit is formed into a cutting edge. The forward wall in the direction of rotation may be turned sharply upwardly in a manner similar to the offsets 55 so that clearance will be provided to facilitate the movement of the blades over the surface or dirt presented thereto and also to aid in supporting the loosened dirt. Upon the head 48 is pivotally mounted a latch 58 having a lip 59 at its lower end which is adapted to project under the arms 50 and 52 and thereby support the arm 52 while the digger is at work. The latch is so formed that it will fit closely around the arm 50 and is pivoted upon the head 48 above the said arm, a coiled spring 60 being provided about the pivot of the latch to hold it normally in its operative position shown in Fig. 10 and to return it automatically to said position after it has been tripped. The lower end of the latch is so formed as to present an inclined or beveled surface 61 to the arm 52 as that arm is returned to locked position after the dirt has been discharged, the arm riding upon said beveled surface so as to push the latch aside and clear the same in order to resume its position between the branches of the bifurcated arm 50. The latch is constructed with an upstanding finger 62 above its pivot and this finger is adapted to be engaged by the lower end of a trip lever 63 which is mounted upon an arm or bracket 64 which is fitted about the lower portion of the digger shaft 47 and extends laterally therefrom.

The arm of bracket 64, which has been just mentioned, is rotatably engaged by the shaft 47 and is held against movement along the said shaft by stop collars 65 secured to the shaft above and below the bracket. The bracket is secured rigidly to the lower end of a rack bar 66 which extends upwardly through a suitable guide opening in the beam 27 parallel with the shaft 47 and is engaged by a pinion 67 carried by a shaft 68 mounted in suitable bearings upon the beam. This shaft 68 is equipped with a hand wheel 69 so that it may be rotated to effect raising or lowering of the blades, and a dog 70 is provided to hold the shaft in a set position. As the work of digging the hole progresses, the hand wheel 69 will be rotated so as to effect downward movement of the rack bar 66 which will, of course, cause a corresponding downward movement of the shaft 47 and the blades 54. When sufficient dirt has been loosened and accumulated upon the terminals 56 of the blades, the hand wheel 69 is rotated so as to effect upward movement of the rack bar and the digger so that the loosened dirt will be lifted from the hole and will be supported above the surface of the ground. The beam 27 and the parts supported thereby may then be swung readily to one side and when they have passed entirely clear of the hole, the trip lever 63 is rocked so that its lower end will ride against the outer side of the finger 62 of the latch and will swing the latch to release the arm 52, whereupon the weight of the dirt supported by the bent terminals 56 will cause the said arm 52 to swing upon its pivot and permit the plates 54 to separate so that the dirt will be dumped upon the ground. It will be readily noted that the pivot stud 33 is alined vertically with the universal joints whereby the shaft 22 is connected to the shaft 6 and the beam 27 is connected to the lower end of the radius bar 30, so that there will be no resistance offered to the lateral movement of the beam and the parts associated therewith.

From the foregoing description, taken in connection with the accompanying drawings, it will be evident that, after the blades have been brought into position over the point where a post hole is to be dug, the clutch sleeve 13 is caused to engage the clutch end of the hub of the driving pulley 7, whereupon motion will be imparted to the driving shaft 6 and transmitted directly to the shaft 22. The motion of the shaft 22 will be, of course, transmitted to the digger shaft 47 so that the blades will be rotated and their cutting edges caused to advance through the ground and loosen the soil so as to form a circular hole. If the ground is level, the beam 27 and the shaft 22 will be supported in a horizontal position by bringing the pinions 42 to the centers of the racks 41, and the digger shaft and diggers will be perpendicular inasmuch as they are at a right angle to the beam 27. If the surface of the ground should not be level but should have a pitched grade so that the truck assumes an inclination, as shown in Fig. 2, the beam 27 and the shaft 22 may be brought to a horizontal position by rotating the shaft 43 in a proper direction to cause the pinions 42 to ride toward the lower ends of the racks 41, and in order that exactness may be attained in the adjustment, the beam may be equipped with a spirit or other form of level if so desired. If the grade of the ground is such that the truck is inclined reversely to the inclination shown in Fig. 2, the working parts may be brought into the desired horizontal position by causing the pinions 42 to ride toward the upper ends of the racks 41. It may sometimes be necessary, owing to particular conditions, to shift the beam 27 and the shaft 22 in a transverse direction and this result is accomplished by moving the radius rod 30 about its pivotal mounting upon the shaft 6. It may sometimes be necessary to utilize both adjustments and this, of course, may be done readily and easily. When the beam 27 and the shaft 22 are adjusted by manipulation of the pinions 42 and the racks 41, the shaft 22 obviously has a tendency to move endwise relative to the beam 27. This tendency is accommodated by the slidable engagement of the inner end of the shaft with the socket 21. My apparatus may be mounted upon any truck or other vehicle and, when not in use, may be swung around close to the side of the vehicle so that it may be stored within a barn and will occupy a relatively small space. The digger shaft and the rack by which the same is adjusted vertically may also be withdrawn from their operative positions and disposed horizontally upon the beam 27 so as to further economize in storage space.

Having thus described the invention, what is claimed as new is:

1. An apparatus for the purpose set forth comprising a frame adapted to be mounted upon a vehicle, a supporting beam connected with the frame for universal movement, a digger mounted upon said beam at the outer end thereof, a shaft supported by said beam and operatively connected with the digger, a shaft mounted upon the frame and connected with the first-mentioned shaft by a universal joint, and means connecting the frame and the lateral beam whereby to maintain the beam in a horizontal position.

2. An apparatus for the purpose set forth comprising a frame to be mounted upon a vehicle, a drive shaft mounted in said frame, a transmission shaft disposed laterally with respect to the frame and connected with the driving shaft by a universal joint, a bar mounted for pivotal movement about the driving shaft immediately adjacent the said frame, a supporting beam disposed below the transmission shaft parallel therewith and having a universal connection with the lower end of the said pivotally mounted bar, a digger carried by the outer end of the said beam and operatively connected with the transmission shaft, and means co-operating with the bar and the upper end of the pivotally mounted bar whereby to maintain the beam and the transmission shaft in a horizontal position.

3. In an apparatus for the purpose set forth, the combination of a frame to be mounted upon a vehicle, a driving shaft mounted in said frame, a radius bar pivotally fitted upon the outer end of said shaft immediately adjacent the frame, means for rotating the shaft, a supporting beam disposed at the side of the said frame and having a universal connection with the lower end of the radius bar, a transmission shaft carried by said beam and having a universal connection with the outer end of the driving shaft, a bracing frame pivotally engaged at its upper end upon the upper end of the radius bar, the upper end of the radius bar being offset and the terminal of the offset portion being alined vertically with the universal connections between the driving shaft and the transmission shaft and between the supporting beam and the radius bar, means carried by the supporting beam and co-operating with the lower end of the bracing frame whereby to maintain the beam in a horizontal position, and a digger carried by the outer end of the supporting beam and operatively connected with the transmission shaft.

4. In an apparatus for the purpose set forth, the combination of a supporting beam, a digger shaft carried by the outer end of the beam and mounted for rotation about a vertical axis and for endwise movement in a vertical direction, means carried by the said beam for rotating the shaft, blades carried by the lower end of said shaft, a laterally disposed bracket having a swiveled connection with the lower portion of the shaft, a rack rising from the said bracket, and means on the beam co-operating with said rack to effect vertical movement of the digger shaft and the digger.

5. In an apparatus for the purpose set forth, the combination of a supporting beam, a digger shaft mounted at the outer end of said beam for rotation about a vertical axis and for movement along said axis, a head carried by the lower extremity of said shaft, lateral arms extending from said head, a digger blade secured to the outer end of one of said arms, the other of said arms being bifurcated, an arm pivotally mounted within the bifurcated arm, a blade carried by said pivotally mounted arm, means for normally restraining the pivotal movement of said arm, and means carried by the laterally extending bracket for releasing said restraining means.

6. In an apparatus for the purpose set forth, the combination of a supporting beam, a digger shaft carried by the outer end of said beam and mounted for rotation about a vertical axis and for movement along said axis, means on the beam for rotating said shaft, means supported by the beam for effecting vertical movement of the digger shaft, a head carried by the lower end of the digger shaft, arms extending laterally from said head, one of said arms carrying a blade and the other of said arms being bifurcated, a supporting arm pivotally mounted within said bifurcated arm, a blade carried by said pivotally mounted arm, a latch mounted on the head and normally projecting under the pivotally mounted arm to restrain movement of the same, said latch being provided with an upstanding finger, and a trip lever mounted above said latch and adapted to ride upon the outer side of said finger whereby to release the latch.

In testimony whereof I affix my signature.

ORAN D. MONROE. [L. s.]